J. L. SHUTE.
EGG SUPPORTING DEVICE.
APPLICATION FILED JAN. 6, 1913.
1,081,870.
Patented Dec. 16, 1913.
3 SHEETS—SHEET 3.
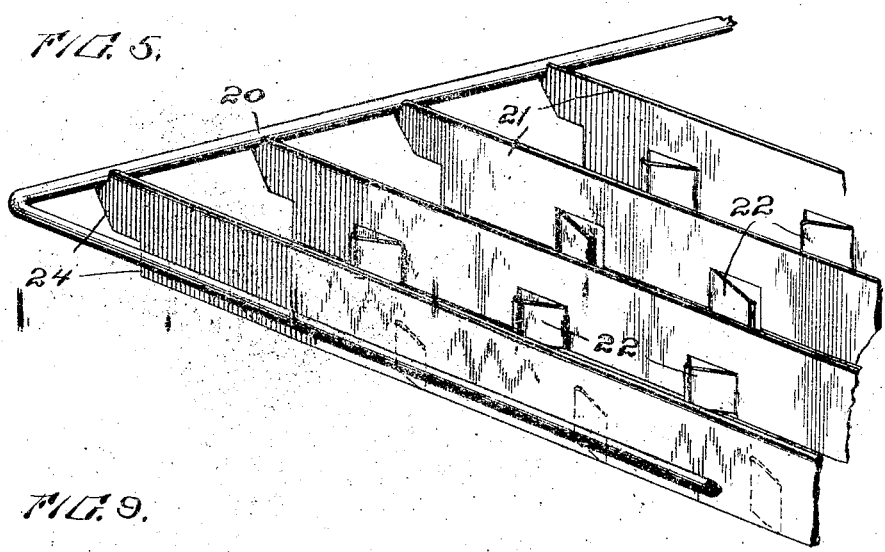
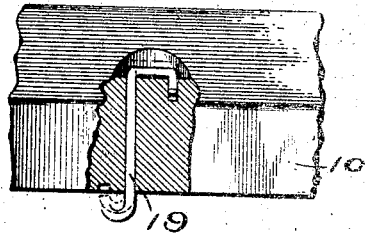
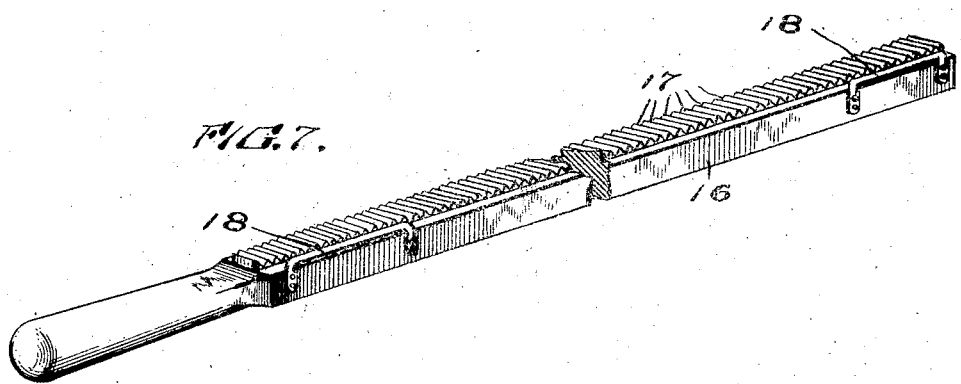
Witnesses
R. S. Trogner
L. D. Morrill
Inventor
James L. Shute
By Mason Fenwick & Lawrence
Attorneys

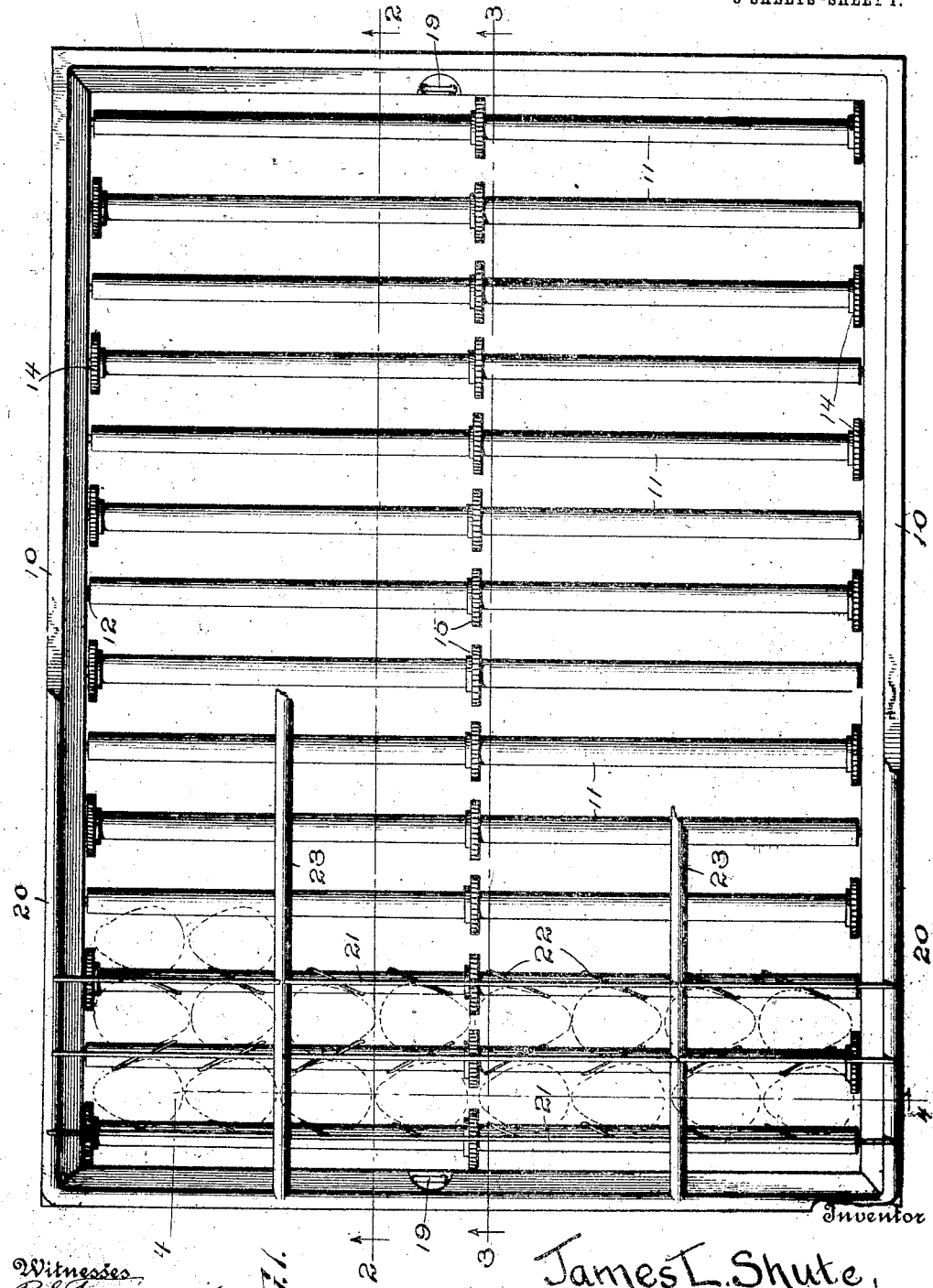

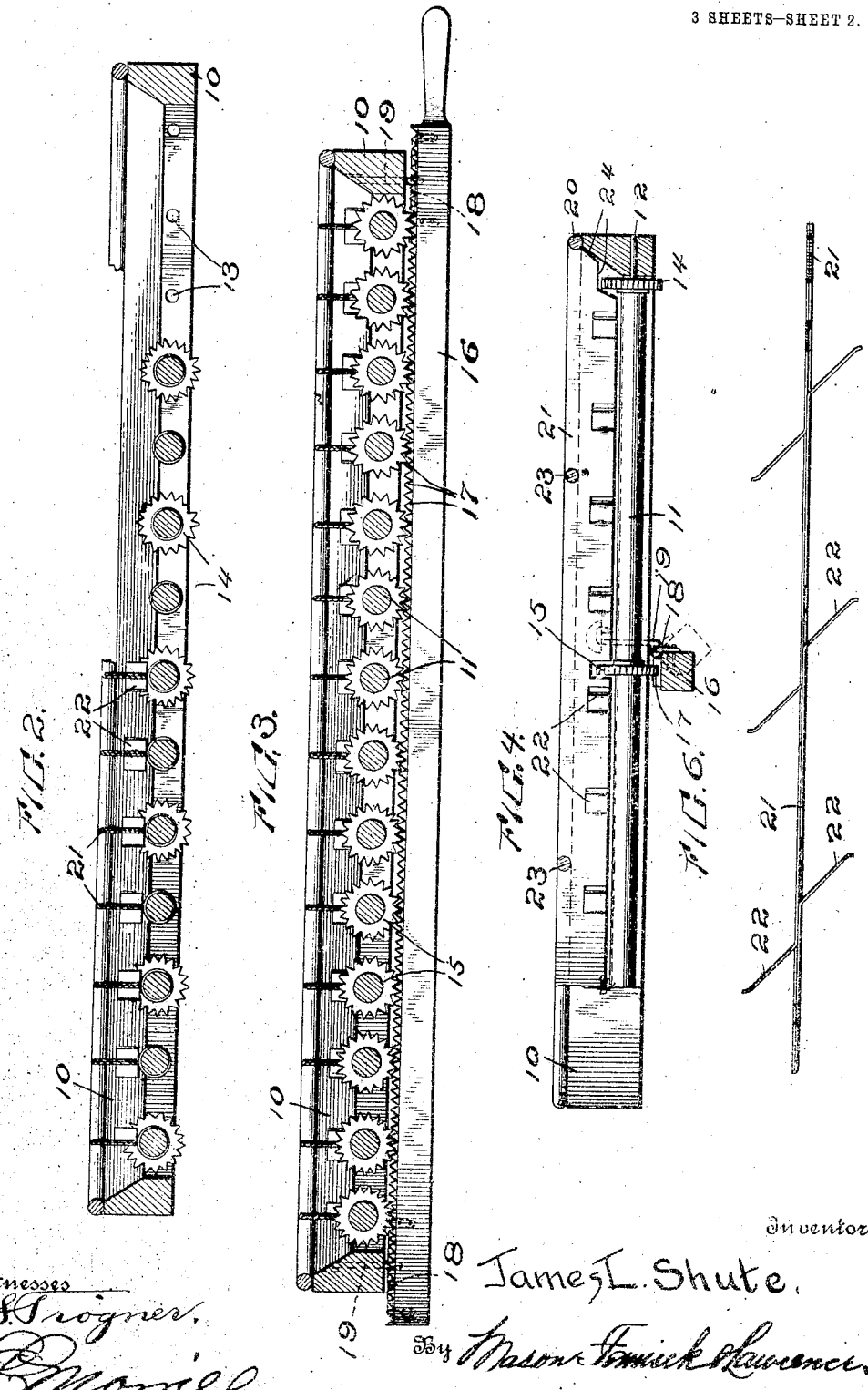

UNITED STATES PATENT OFFICE.

JAMES L. SHUTE, OF SEATTLE, WASHINGTON.

EGG-SUPPORTING DEVICE.

1,081,870.  Specification of Letters Patent.  Patented Dec. 16, 1913.

Application filed January 6, 1913. Serial No. 740,517.

*To all whom it may concern:*

Be it known that I, JAMES L. SHUTE, a citizen of the United States, residing at Seattle, in the county of King and State of Washington, have invented certain new and useful Improvements in Egg-Supporting Devices; and I do hereby declare the following to be a full, clear, and exact description of the invention, such as will enable others skilled in the art to which it appertains to make and use the same.

This invention relates to egg supporting and turning devices for incubators and has for an object to provide a roller surface for supporting eggs with a detachable member for retaining the eggs in position while being turned.

A further object of the invention is to provide improved means for rotating the rollers for turning the eggs.

A further object of the invention is to provide attachments for the rollers adapting the device for turning the eggs with the implement referred to and also providing means whereby the rollers may be rotated and the eggs turned without the use of such implement.

With these and other objects in view the invention comprises certain novel constructions, combinations and arrangement of parts as will be hereinafter more fully described and claimed.

In the drawings: Figure 1 is a top plan view of the device. Fig. 2 is a longitudinal view of the device taken on line 2—2 of Fig. 1. Fig. 3 is a sectional view of the device taken on line 3—3 of Fig. 1. Fig. 4 is a sectional view of the device taken on line 4—4 of Fig. 1. Fig. 5 is a perspective view of the removable egg positioning frame. Fig. 6 is a view in inverted plan of one of the grid bars of the positioning member. Fig. 7 is a perspective view of the roller turning implement. Fig. 8 is a perspective view of one of the implement supporting hooks. Fig. 9 is a sectional view showing the manner of attaching the hooks to the frame.

Like characters of reference designate corresponding parts throughout the several views.

The improved egg supporting device which forms the subject matter of this application comprises a frame 10 which may be and preferably though not necessarily is a part of the incubator structure. Between the side bars of the frame 10 a plurality of rollers 11 are journaled, such journaling being provided in any approved manner as by trunnions 12 inserted in bearings 13 in such side framing. The rollers 11 extend transversely across the frame and are spaced preferably to support eggs laid between such rollers as indicated in dotted lines in Fig. 1.

Each of the rollers 11 is provided with one or more star wheels as shown in the drawings, alternate rollers being provided with the star wheels 14 at opposite ends while intermediate the ends adjacent the center other star wheels 15 are provided. As will be noted especially from Figs. 2 and 4 all of the star wheels 14 and 15 extend downwardly below the lines of the frame 10 and if the frame is constructed as a separate removable structure the entire frame carrying the rollers and eggs thereon may be taken off from the incubator housing, set upon the top of a table, floor or other flat surface and moved along whereupon the star wheels engaging the surface of the table or the like will serve to rotate the rollers.

Where it is desirable not to remove the frame and rotate the rollers to turn the eggs as above described an implement shown as a whole at 16 is provided in the form of an elongated bar having rack teeth 17 formed along one side, such rack teeth being proportioned to engage with the teeth of the star wheels 15. To mount the rack bar 16 in proper position for engaging the star wheels 15 such bar is provided with guide members 18 secured to one side of the bar and hooks 19 are carried by the frame 10. So that the hooks 19 will not prevent the frame being removed and the eggs being turned by setting upon a table as previously described the hooks are made slidable in the frame 10 as indicated particularly at Fig. 9. As will be apparent from an examination of Fig. 4 the rack bar may be engaged upon the hooks 19 in an inclined position as shown in dotted lines whereby the bar is free to move without engaging the star wheels 15. The rack bar may then be moved to either limit of its movement in such inclined position and then turn up to engaging position as shown in full lines and either pulled or pushed the necessary distance to accomplish the rotation of the rollers and the consequent turning of the eggs. Following this the rack bar may be detached from the hooks if the structure is such that the detachment is found desirable.

When eggs are supported upon a roller surface such as that disclosed in the drawings and are turned by rotating the rollers it is found that the eggs "creep" longitudinally of the rollers and become piled up or stood upon end which is undesirable. To prevent such creeping of the eggs a positioning grid is provided comprising an outer frame 20 constructed of any approved material, here shown as composed of wire or rods with bars 21 extending transversely between such outer frame members 20 and preferably spaced to be located immediately over the center of each of the rollers and consequently immediately between each two rows of eggs. The bars 21 are preferably constructed of two thicknesses of sheet material as shown particularly at Figs. 2, 3 and 6 either folded or otherwise secured together with tongues 22 struck up from such metal and extending laterally therefrom as indicated particularly at Figs. 1 and 6 such tongues being positioned to engage the sides of proximate eggs and prevent any movement of such eggs longitudinally of the rollers. The grid bars 21 may be further strengthened by means of intermediate bars 23 although it is to be understood that such intermediate bars are purely matters of choice. The grid bars 21 are secured to the frame members 20 in any approved manner and are formed at the ends as indicated at 24 as may be found necessary to clear the side framing 10 and the star wheels 14.

It will be understood, of course, that the frame 20 with its accompanying members is employed only during the process of turning the eggs, being placed upon the frame 10 just prior to such turning and removed therefrom when such turning is completed.

I claim:

1. In an egg supporting device, a frame, rollers journaled upon the frame, star wheels carried by the rollers extending below the lines of the frame and a rack bar mounted adjacent to the wheels and placed in engagement therewith by a pivotal movement transversely of the said axis of the bar.

2. In an egg supporting device, a plurality of spaced rollers, star wheels carried by the rollers in alinement, a rack bar positioned adjacent the line of star wheels, and means for mounting the rack bar and permitting movement of the latter in a direction transversely of the bar for throwing it into and out of engagement with the wheels.

3. In an egg supporting device, a plurality of spaced rollers, toothed wheels carried by the rollers, a rack bar, means including a device carried by one longitudinal side of the rack bar enabling the rack bar to be thrown out of engagement with the wheels by gravity.

4. In an egg supporting device, a plurality of spaced rollers, toothed wheels carried by the rollers in alinement, bearing and supporting members adjacent the line of wheels, a rack bar having engaging teeth along its top surface and guide members along one side of the bar permitting a sliding and swinging movement of said bar, the guide members being adapted to engage the bearing members.

5. In an egg supporting device, a frame, a plurality of spaced rollers journaled in the frame, toothed wheels carried by the rollers, hooks carried by the frame spaced upon the same side of the line of toothed wheels, a bar provided with a rack along its top surface and guide members secured to one side of the bar in position to pivotally engage the hooks.

6. In an egg supporting device, a frame, a plurality of rollers journaled in the frame in spaced relation, and a grid comprising bars spaced immediately over the rollers extending longitudinally thereof, adjacent bars aiding in holding the eggs in a given position in contact with adjacent rollers.

7. In an egg supporting device, a plurality of spaced rollers, a frame removable from the rollers, grid bars carried by the frame and spaced to the position immediately over the rollers extending longitudinally thereof, adjacent bars aiding in holding the eggs in a given position in contact with adjacent rollers, and tongues extending laterally from the grid bars.

8. In an egg supporting device, a plurality of spaced rollers, a frame surrounding the spaced rollers, grid bars attached to the frame and extending longitudinally above and in parallelism with the rollers and egg engaging tongues extending laterally from the bars toward the adjacent bars, said rollers, grid bars and tongues forming a plurality of individual egg compartments having straight sides and a trough-like bottom, each compartment being formed of a plurality of rollers and given rollers forming adjacent sides of adjacent troughs.

In testimony whereof I affix my signature in presence of two witnesses.

JAMES L. SHUTE.

Witnesses:
M. L. PHILIPPI,
W. B. PARMELE.